United States Patent
Moghe et al.

(10) Patent No.: US 10,591,059 B2
(45) Date of Patent: Mar. 17, 2020

(54) PISTON WITH COOLING OIL DIVERTER

(71) Applicant: MAHLE International GmbH, Stuttgart (DE)

(72) Inventors: Shashank Shrikant Moghe, Farmington Hills, MI (US); Scott Michael Janowiak, South Lyon, MI (US)

(73) Assignee: MAHLE International GmbH, Stuttgart (DE)

(*) Notice: Subject to any disclaimer, the term of this patent is extended or adjusted under 35 U.S.C. 154(b) by 119 days.

(21) Appl. No.: 16/000,460

(22) Filed: Jun. 5, 2018

(65) Prior Publication Data
US 2019/0368606 A1    Dec. 5, 2019

(51) Int. Cl.
| | |
|---|---|
| *F02F 3/22* | (2006.01) |
| *F01P 3/08* | (2006.01) |
| *F16J 1/09* | (2006.01) |
| *F01P 3/10* | (2006.01) |
| *F16J 1/08* | (2006.01) |
| *F02F 3/16* | (2006.01) |
| *F02F 3/00* | (2006.01) |

(52) U.S. Cl.
CPC . *F16J 1/09* (2013.01); *F01P 3/08* (2013.01); *F01P 3/10* (2013.01); *F02F 3/16* (2013.01); *F02F 3/22* (2013.01); *F16J 1/08* (2013.01); *F02F 2003/0061* (2013.01)

(58) Field of Classification Search
CPC ........ F01P 1/04; F01P 3/10; F01P 3/08; F01P 2003/006; B23P 15/10; F16J 1/09; F16J 1/08

USPC ...................................... 123/193.6; 29/888.04
See application file for complete search history.

(56) References Cited

U.S. PATENT DOCUMENTS

| | | | | |
|---|---|---|---|---|
| 4,175,502 | A | 11/1979 | Moebus | |
| 4,587,932 | A | 5/1986 | Moebus | |
| 5,144,923 | A * | 9/1992 | Leites | B23P 15/10 123/193.6 |
| 5,778,846 | A * | 7/1998 | Mielke | F02F 3/003 123/193.6 |
| 6,659,062 | B1 * | 12/2003 | Issler | F02F 3/22 123/193.6 |
| 6,691,666 | B1 * | 2/2004 | Berr | F02F 3/003 123/193.6 |
| 8,347,842 | B2 * | 1/2013 | Sadowski | F02F 3/22 123/193.6 |
| 9,238,283 | B2 | 1/2016 | Gniesmer | |
| 2014/0102294 | A1 | 4/2014 | Klein | |
| 2014/0318492 | A1 | 10/2014 | Linke et al. | |

FOREIGN PATENT DOCUMENTS

DE    10 2006 022 413 B4    3/2011

* cited by examiner

*Primary Examiner* — Syed O Hasan
(74) *Attorney, Agent, or Firm* — Collard & Roe, P.C.

(57) ABSTRACT

A piston for an internal combustion engine has a piston head, a pin boss with pin bores, and a piston skirt. The piston head has a combustion bowl, a ring belt with ring grooves, a circumferential cooling channel, and at least one diverter rod connected to the ring belt and extending into the cooling channel. The diverter rod diverts the spray of cooling oil within the cooling channel to achieve more uniform and efficient cooling of the piston during operation.

10 Claims, 2 Drawing Sheets

PISTON WITH COOLING OIL DIVERTER

BACKGROUND OF THE INVENTION

1. Field of the Invention

This invention relates to a piston having a circumferential cooling channel with a device for diverting the oil within the channel to split the oil stream and achieve more efficient cooling of the piston.

2. The Prior Art

In conventional pistons having a circumferential cooling channel, cooling oil is injected into the channel via an oil nozzle and the oil is sprayed in a generally uniform manner. The oil then impacts the walls of the channel and can run down the sides or splash to the bottom. While this can cool the piston, the single spray creates an uneven distribution of the cooling oil and thus less efficient cooling than if the cooling oil were more broadly dispersed.

SUMMARY OF THE INVENTION

It is therefore an object of the invention to provide a piston having a circumferential cooling channel in which the cooling oil can be efficiently dispersed. It is another object of the invention to provide a piston in which the effective cooling can be accomplished easily and economically.

These and other objects are accomplished by a piston for an internal combustion engine, comprising a piston head, a pin boss with pin bores, and a piston skirt. The piston head has a combustion bowl, a ring belt with ring grooves, and a circumferential cooling channel, and at least one diverter rod connected to the ring belt and extending into the cooling channel. The diverter rod diverts the spray of cooling oil inside the cooling channel, to achieve more uniform distribution of the cooling oil and thus a more efficient cooling of the piston.

For ease of manufacture, the diverter rod is formed as a separate piece from the piston head. The diverter rod extends into the cooling channel through an aperture in the ring belt, so that the piston can be manufactured, and then the diverter rod installed by drilling a hole in the ring belt and inserting the diverter rod afterward. The diverter rod can be held in place by friction fit with the aperture, or can be welded or swaged in place for a more secure fit. Other methods known in the art could also be used, such as threading or adhesives.

Preferably, the diverter rod extends across the entire width of the cooling channel to the opposite end of the cooling channel. There can be several diverter rods placed around the piston with equal or unequal spacing around the piston.

The diverter rod is preferably made from a material that has a high heat tolerance, due to the heat on the ring belt.

The diverter rod can have any suitable cross-sectional shape, such as round, triangular, square, rectangular and oval.

The diverter rod can also be solid or hollow. In addition, the shape may be designed to further custom direct the oil flow and divert the oil of optimize the catch efficiency within the cooling gallery and shaped to optimize the flow based on hot spots within the cooling channel and splitting the oil inlet to reduce any splash back out through the inlet.

Preferably, the diverter rod is inserted through the ring belt outside the ring grooves, so as not to interfere with the fit of the piston rings in the ring grooves.

In one embodiment, the piston is formed from a piston upper part having a combustion bowl and a ring belt with ring grooves, and a piston lower part connected to the piston upper part and having a pin boss, pin bores for accommodating a piston pin, and a piston skirt. The circumferential cooling channel is disposed adjacent the ring belt and is formed jointly by the piston upper part and piston lower part. The diverter rod is inserted after the piston is fully formed and the upper and lower parts are connected to each other, usually by welding.

Use of the diverter rod increases the effectiveness of the cooling oil. By using a separate rod that is inserted into the finished piston, the increased effectiveness in cooling can be accomplished simply and economically.

The invention also relates to a method of manufacturing a piston having the diverter rod, in which a hole is formed in the ring belt, the hole corresponding to a diameter of the diverter rod, and the diverter rod is inserted through the hole until the diverter rod extends at least partially across a width of the circumferential cooling channel.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
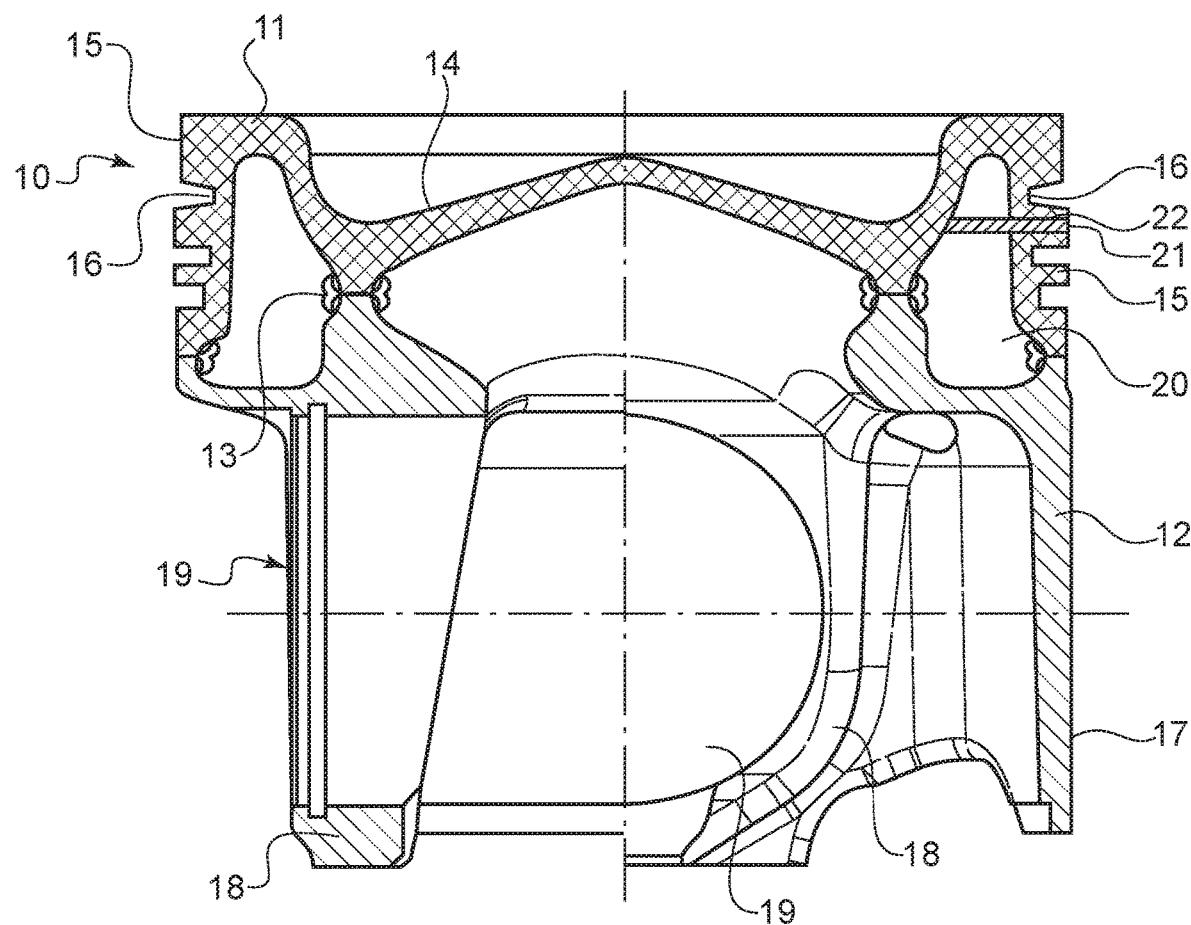
FIG. 1 shows a cross-section of a piston according to the invention.

Referring now in detail to the drawings and, in particular, FIG. 1 shows a cross-section in two axes of a piston according to the invention. Piston 10 comprises an upper part 11 and a lower part 12, which is welded to upper part 11 at weld seams 13. Upper part 11 has a combustion bowl 14 and a ring belt 15, with ring grooves 16. Lower part 12 has a pin boss 18 with a pin bore 19 and a skirt 17. A cooling channel 20 is formed between upper part 11 and lower part 12. Cooling channel 20 is closed all around and holds cooling oil (not shown).

A diverter rod 21 is inserted through a hole 22 in ring belt Diverter rod 21 extends across the entire width w of cooling channel 20. There can be multiple diverter rods 21 placed around the circumference of piston 10. Diverter rods 21 act to divert the spray of cooling oil and increase its cooling efficiency.

Figure 2:
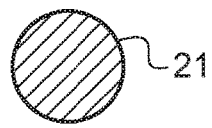
FIG. 2 shows a cross-section of a diverter rod for use in the piston according to the invention.
Figure 3:
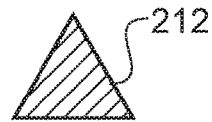
FIG. 3 shows a cross-section of another diverter rod for use in the piston according to the invention.

As shown in FIGS. 2 and 3, diverter rod 21 can have a round cross-section, or a triangular cross section as shown by diverter rod 212 in FIG. 3. Other cross-sectional shapes can also be used.

In addition, the diverter rod 21 may include various design features for securing the diverter rod 21 within the cooling channel 20. Such design features may include a threaded end. The diverter rod 21 may be further configured to optimize the oil direction with geometrical features, fins, rifling or various axial shapes along the rod 21 for improving the catch efficiency, and reducing the splash back out of the inlet of the cooling channel. The diverter rod 21 may take on various other geometrical features such as a drill bit, or other geometrical features that vary axially along the diverter rod 21.

Figure 4:
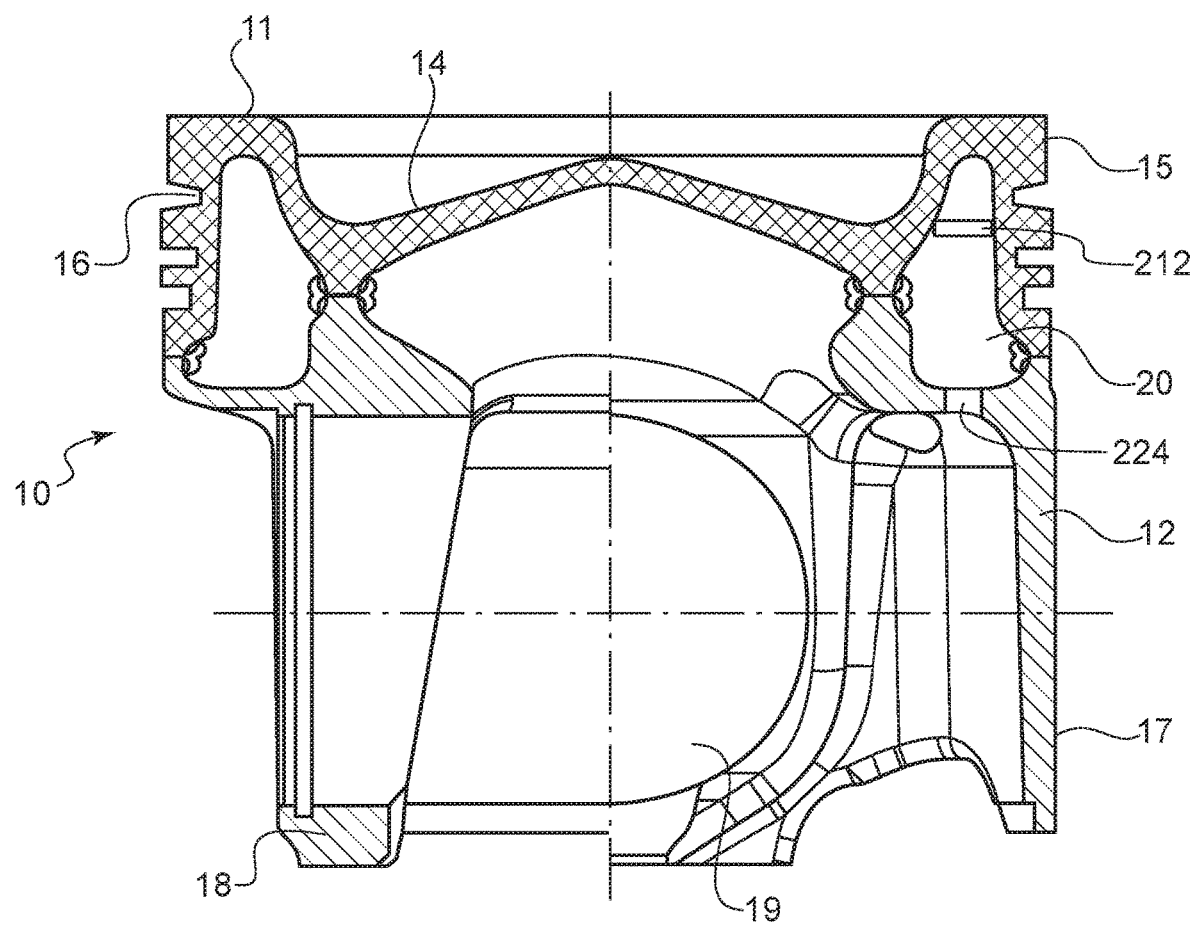
FIG. 4 shows a cross-section of a piston according to another embodiment of the invention.
Figure 5:
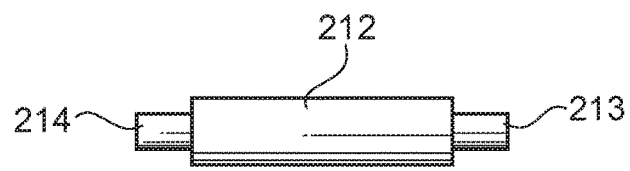
FIG. 5 shows another embodiment of the diverter rod of FIG. 4 with a spring mechanism.

Referring to FIGS. 4 and 5, the diverter rod 212 may comprise a compressible portion 213, 214, i.e. a spring mechanism, or be made of a spring material. In this embodiment of the invention, the diverter rod 212 may be compressed via a force and inserted into the cooling channel 20 through the oil inlet 224. The diverter rod 212 may optionally be secured into the cooling channel 20 by the expansion force of the compressible portion.

Accordingly, while only a few embodiments of the present invention have been shown and described, it is obvious that many changes and modifications may be made thereunto without departing from the spirit and scope of the invention.

What is claimed is:

1. A piston for an internal combustion engine, comprising: a piston head having a combustion bowl, a ring belt with ring grooves, and a circumferential cooling channel disposed adjacent the ring belt, the cooling channel having an oil inlet in a bottom surface thereof; and at least one diverter rod to the ring belt and extending into the cooling channel, wherein the diverter rod is formed as a separate piece from the piston head and located such that the diverter rod splits a jet of oil coming from the oil inlet and wherein the diverter rod extends across an entire width of the cooling channel.

2. The piston according to claim 1, wherein the at least one diverter rod extends into the cooling channel through an aperture in the ring belt.

3. The piston according to claim 1, wherein the at least one diverter rod has a cross-sectional shape selected from the group consisting of round, triangular, square, rectangular and oval.

4. The piston according to claim 1, wherein the at least one diverter rod is inserted through the ring belt outside the ring grooves.

5. The piston according to claim 1, wherein the diverter rod has at least one compressible portion, and wherein the diverter rod is held in place in the cooling channel by tension from the compressible portion.

6. A piston for an internal combustion engine, comprising: a piston upper part having a combustion bowl and a ring belt with ring grooves, a piston lower part connected to the piston upper part and having a pin boss, pin bores for accommodating a piston pin, and a piston skirt; a circumferential cooling channel disposed adjacent the ring belt and formed jointly by the piston upper part and piston lower part, the cooling channel having an oil inlet in a bottom surface thereof; and at least one diverter rod connected to the ring belt and extending into the cooling channel, wherein the diverter rod is formed as a separate piece from the piston head and is located such that the diverter rod splits a jet of oil coming from the oil inlet and wherein the diverter rod extends across an entire width of the cooling channel.

7. A method of installing a diverter rod in a piston having a ring belt with ring grooves and a circumferential cooling channel disposed adjacent the ring belt, the cooling channel having an oil inlet in a bottom surface thereof, comprising: inserting a diverter rod into the circumferential cooling channel so that the diverter rod extends across an entire width of the circumferential cooling channel, the diverter rod is formed as a separate piece from a piston head and is located such that the diverter rod splits a jet of oil coming from the oil inlet.

8. The method according to claim 7, further comprising the step of drilling a hole through the ring belt, and inserting the diverter rod through the hole in the ring belt.

9. The method according to claim 7, further comprising fixing the diverter rod in place after the step of inserting.

10. The method according to claim 7, wherein the diverter rod is inserted into the cooling channel through an oil inlet and held in place via a spring force from a compressible portion of the diverter rod.

\* \* \* \* \*